3,002,016
PREPARATION OF ETHYL ACRYLATE

George A. Elliott, Petersburg, and Seymour A. Furbush, Hopewell, Va., assignors to Allied Chemical Corporation, New York, N.Y., a corporation of New York.
No Drawing. Filed June 8, 1959, Ser. No. 818,547
1 Claim. (Cl. 260—486)

This invention relates to preparation of ethyl acrylate and more particularly to a process for preparation of ethyl acrylate by simultaneous reaction of acetylene, ethyl alcohol, carbon monoxide, nickel carbonyl and acid in the presence of a mercuric halide as promoter, the carbon monoxide being present at the outset of the reaction.

It is known that ethyl alcohol, acetylene, nickel carbonyl and acid react to form ethyl acrylate. The reaction may be theoretically represented by the following equation:

(1) 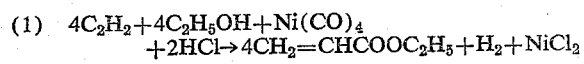
$+2HCl \rightarrow 4CH_2=CHCOOC_2H_5+H_2+NiCl_2$

It is also known that the basic reaction between carbon monoxide, acetylene and ethyl alcohol, i.e.

(2) 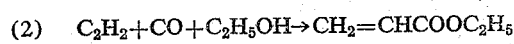

can be effected at elevated temperatures (130° C.–180° C.) and high pressures (about 30 atmospheres and higher) in the presence of catalyst such as nickel bromide or nickel iodide. The last-mentioned reaction involving use of elevated temperatures and high pressures is disadvantageous due to rapid depletion of catalyst, decomposition of acetylene with attendant carbon formation and clogging of apparatus, marked tendency of the acrylate to polymerize at the high temperatures, the hazards of handling acetylene at the high pressures required, and the special equipment required at the high pressures.

Ethyl acrylate has also been prepared by a low temperature, low pressure process involving first carrying out the reaction in the absence of carbon monoxide gas for an induction period until the reaction has become well established, and then introducing carbon monoxide gas to the reaction zone as a reactant. The process is disclosed in U.S. Patent 2,582,911 of January 15, 1952. This process is not entirely satisfactory for the reasons that re-establishment of the reaction is difficult to effect in the event of a shutdown or cessation of reaction by interruption of a feed stream, and economical smooth operation is not provided.

One object of this invention is to provide a process for preparation of ethyl acrylate under conditions of low temperature and pressure using a large proportion of the total CO furnished as carbon monoxide gas from the outset of the reaction wherein rapid establishment of the ethyl acrylate synthesis is achieved.

Another object is to provide a process for preparation of ethyl acrylate wherein re-establishment of the reaction is relatively easily effected in the event of a shutdown, or cessation of the reaction by interruption of a feed stream.

Another object is to provide a process for preparation of ethyl acrylate wherein the reaction is stabilized and made less sensitive to minor maladjustments of the ratios of reactants being supplied.

A further object is to provide a process for preparation of ethyl acrylate which provides economical and smooth operation.

A further object is to provide a process for preparation of ethyl acrylate wherein toxic hazards due to nickel carbonyl are maintained at a minimum.

Additional objects and advantages will be apparent as the invention is hereafter described in more detail.

In accordance with the present invention, it has been found that ethyl acrylate can be prepared by mixing and simultaneously reacting at low temperature acetylene, ethyl alcohol, carbon monoxide, nickel carbonyl and hydrogen chloride with the carbon monoxide gas present from the outset without the necessity of first establishing the stoichiometric reaction of nickel carbonyl, ethyl alcohol and acetylene by carrying out the reaction in the presence of a mercuric halide as a promoter. It was found that with the promoter and the carbon monoxide gas present at the outset of the reaction in quantities approaching or equal to the quantities of such gas desired ultimately for the reaction, substantial proportions of carbon monoxide were consumed and appreciable production of ethyl acrylate resulted. The process is superior to the prior art processes for the reasons: (1) re-establishment of the reaction is relatively easily effected in the event of a shutdown or cessation of the reaction by interruption of a feed stream; (2) the reaction is stabilized due to the promoter and made less sensitive to minor maladjustments of the ratios of reactants being supplied; (3) relatively low or moderate temperatures and pressures are employed and special equipment required for higher pressures is not required; (4) rapid establishment of the reaction occurs in the presence of relatively large amounts of carbon monoxide gas from the outset; (5) the process provides economical smooth operation; and, (6) toxic hazards due to presence of nickel carbonyl in reactor off gas and plant effluent streams are kept at a minimum.

Mercuric chloride is the preferred promoter. In general promoter concentration is about 0.5–10% by weight based on the initial ethyl alcohol charge to the reactor. While concentrations of promoter greater than 10% may be used, such greater concentrations serve little, if any, purpose and may be disadvantageous from an economic standpoint. Optimum concentration of mercuric chloride is about 0.5–5%. The mercuric halide promoter of this invention is characterized by being soluble in ethyl alcohol.

In general, reaction temperatures of about 30° C.–65° C. are employed in the process. When about 60–80% of the total CO is furnished as carbon monoxide gas, the start up temperature is best maintained at about 30° C.–34° C. Once the reaction is well established, the temperature is preferably maintained at about 35° C.–60° C. by cooling. The time at which the reaction is well established is indicated by an abrupt or sudden rise in the reaction temperature. The reaction proceeds satisfactorily at atmospheric pressure. However, pressures up to 10 or 15 p.s.i.g. or more may be employed, if desired.

The amount of hydrogen chloride used is preferably approximately equivalent to the nickel of the nickel carbonyl to form nickelous chloride, i.e. two mols hydrogen chloride per mol nickel carbonyl. However, hydrogen chloride to nickel carbonyl mol ratios to 1.4:1 to 3.0:1 have been used without noticeable effect on the reaction. Hydrogen chloride is preferably supplied to the reaction as an anhydrous gas.

Ethyl alcohol employed is preferably free of denaturants and substantially free of water. However, the ethyl alcohol may be denatured (95% alcohol, 5% denaturants) or contain some water (95% alcohol, 5% water). Mol ratios of ethyl alcohol to total CO of 2.0 to 3.0 are advantageous for carrying off the nickel chloride formed.

The reactor system should be purged of oxygen prior to addition of acetylene or carbon monoxide-acetylene mixture. Any inert gas such as nitrogen may be used to purge the system.

Acetylene is preferably provided in a 1 to 1 mol ratio with total CO from carbon monoxide gas and nickel carbonyl. While excesses up to 10% acetylene can be used, excesses above 10% lead to increased by-product formation. The process can be operated with an acetylene to total CO mol ratio as low as 0.9.

Gaseous acetylene and carbon monoxide can be supplied to the reaction in any one of several ways. For example, a 50/50 mixture of acetylene and carbon monoxide, corresponding to the desired proportion of the total CO to be supplied as carbon monoxide gas, can be fed to the reaction zone along with an auxiliary acetylene flow equivalent to the CO from nickel carbonyl. Alternatively the carbon monoxide and all the acetylene can be pre-mixed and fed as one stream. Also, the carbon monoxide and acetylene can be introduced to the reaction zone separately.

Preferably carbon monoxide gas is supplied at the outset of the reaction in amount to supply about 60%–80% of the total CO from both carbon monoxide and nickel carbonyl. This range of carbon monoxide gas is preferred for economical and smooth operation. However, the carbon monoxide gas can be supplied in amount to supply considerably less than 60% of the total CO if desired, the lower limit of the amount of carbon monoxide gas supplied being determined by practical and economic considerations only.

The process can be operated either batchwise or continuously, the latter being preferred for economic reasons. In a preferred continuous operation, a suitable corrosion-resistant reactor provided with heating/cooling coils or a jacket and agitating means, is filled to its overflow point with ethyl alcohol. Promoter, e.g. mercuric chloride is then added to the alcohol in the desired concentration and the solution is saturated with acetylene and carbon monoxide gas. Temperature is maintained at about 30° C. by circulating cooling water through the coils of jack. The reactor is purged with nitrogen to remove oxygen. At zero time, flows are started simultaneously of nickel carbonyl, hydrogen chloride, carbon monoxide gas equivalent to 60–80% of the total CO supplied, acetylene and ethyl alcohol. Consumption of carbon monoxide gas and formation of ethyl acrylate began at once. Within a short time the reaction temperature rises and is controlled with cooling, and ultimate rates of carbon monoxide gas consumption and of ethyl acrylate formation have been attained. The run is continued from this point with 60–80% of the total CO supplied as carbon monoxide gas and no further addition of promoter unless the reaction dies out. As reactants are continuously added, reaction product mixture is continuously withdrawn from the reaction zone. The effluent is advantageously treated with acetylene and, if required, acid to consume any unreacted carbonyl. Ethyl acrylate is then separated from the alcohol and nickel salts, for instance by washing the reaction mixture with water to separate the nickel salts and fractionally distilling the washed mixture.

The following examples illustrate the invention, the parts and percentages being by weight unless otherwise specified.

*Example 1*

A spherical reactor was fitted with a stirrer, water jacket, constant level controller, thermocouple well, reactants inlet tube, reflux condenser, and gas exit line. The reactants inlet tube consisted of two concentric tubes extending near the bottom of the reactor, supply of acetylene, carbon monoxide, and hydrogen chloride gases being connected to the reactor through the inside tube, and supply of nickel carbonyl-ethyl alcohol solution being connected to the reactor through the annulus defined by the tubes. The reactor was charged with a solution of 468 parts of anhydrous ethyl alcohol and 12.1 parts of mercuric chloride as promoter. A mixture of feed gas having the following composition by volume was prepared in a water-sealed holder: CO, 40.6%; $C_2H_2$, 53.7%; $N_2$, 5.5%; $O_2$, 0.2%. Just prior to starting the run the reactor solution was saturated with the feed gas at 30° C. Water at 30° C. temperature was circulated through the reactor throughout the entire run. At zero time, supply of the following materials to the reactor was started simultaneously. 163 parts per hour of a 15.4% solution of nickel carbonyl in ethyl alcohol, 10.5 parts per hour of anhydrous hydrogen chloride and 139 parts per hour of the aforesaid mixed feed gas. Under these conditions 78% of the total CO was supplied as carbon monoxide gas. Progress of the reaction was followed by continuous recording of reactor temperature, frequent sampling of the reactor liquid for analysis of ethyl acrylate content, and by chromatographic analysis of the reactor exit gas every three minutes. The nitrogen added to the feed gas served as an internal standard, comparison of $CO/N_2$ mol ratios in inlet and exit gas providing an accurate indication of the carbon monoxide gas consumption. Carbon monoxide gas consumption and ethyl acrylate production initiated immediately and continued uninterrupted throughout the entire run. The above feed rates were continued without change for a total of 3.8 hours. During this time the temperature range was 35°–39° C. Liquid overflow from the reactor and reactor liquid at shutdown were combined and found to contain 30% ethyl acrylate. Ethyl acrylate formed at an overall rate of 0.94 mol per hour, and the overall exit gas analysis indicated consumption of carbon monoxide gas at an average rate of 0.34 mol per hour.

*Example 2*

Procedure of Example 1 was repeated using the same equipment except that mercuric chloride promoter was omitted from the original reactor charge. After 24 hours of operation during which 79% of the total CO was supplied as carbon monoxide gas, no carbon monoxide gas was consumed, no temperature rise occurred, and only a trace of ethyl acrylate was formed.

*Example 3*

Using the same equipment as in Example 1, the reactor was charged with 468 parts of anhydrous ethyl alcohol and 12.1 parts of mercuric chloride as promoter. Inlet mixed feed gas composition, by volume was CO, 35.2%; $C_2H_2$, 59.2%; $N_2$, 5.3%; $O_2$, 0.3%. Water at temperature of 30° C. was circulated through the reaction jacket throughout the run. At zero time, supply of the following materials to the reactor was started simultaneously: 166 parts per hour of a 22.9% solution of nickel carbonyl in ethyl alcohol, 14.6 parts per hour of anhydrous hydrogen chloride, and 95.5 parts per hour of the aforesaid mixed feed gas. Under these conditions 58.6% of the total CO was supplied as carbon monoxide gas from the outset of the reaction. Carbon monoxide gas consumption during the start up and early stages of the run and rates of carbon monoxide gas consumption and ethyl acrylate formation respectively are summarized as follows.

| Time | Percent CO Gas Consumed | Rate of CO Gas Consumption, Mols per Hour | Rate of Ethyl Acrylate Formation, Mols per Hour |
|---|---|---|---|
| During 1st 3 minutes | 33.8 | 0.42 | 0.19 |
| During 2nd 3 minutes | 17.8 | 0.22 | 0.29 |
| During 3rd 3 minutes | 20.2 | 0.25 | 0.95 |

Feed rates were continued as at the start up and early stages of the run without change for a total of 4.5 hours. Temperature range was 40° C.–42° C. during this time. In the latter part of the run liquid overflowed from the reactor. The overflow and reactor liquid at shutdown were combined and found to contain 36.2% ethyl acrylate. Ethyl acrylate formed at an overall rate of 1 mol per hour, and the overall exit gas analysis indicated consumption of carbon monoxide gas at an average rate of 0.34 mol per hour.

Although certain preferred embodiments of the invention have been disclosed for purpose of illustration, it will be evident that various changes and modifications may be made therein without departing from the scope and spirit of the invention.

What is claimed is:

A process for preparation of ethyl acrylate which comprises mixing and simultaneously reacting acetylene, ethyl alcohol, carbon monoxide, nickel carbonyl and hydrogen chloride at a temperature of about 30° C.–65° C. and under pressure from about atmospheric to about 15 p.s.i.g., said acetylene being in the ratio of 0.9 to 1.1 mols acetylene per mol of total CO from carbon monoxide and nickel carbonyl, said ethyl alcohol being in the ratio of 2.0 to 3.0 mols ethyl alcohol per mol of total CO from carbon monoxide and nickel carbonyl, said carbon monoxide being in an amount to provide about 60–80% of the total CO from carbon monoxide and nickel carbonyl, said nickel carbonyl being in an amount to provide about 20–40% of the total CO from carbon monoxide and nickel carbonyl, and said hydrogen chloride being in the ratio of 1.4 to 3.0 mols hydrogen chloride per mol nickel carbonyl in the presence of about 0.5%–10% by weight based on ethyl alcohol of mercuric chloride as promoter, the carbon monoxide being present from the outset of the reaction, and recovering ethyl acrylate from the reaction mixture.

References Cited in the file of this patent

UNITED STATES PATENTS

| | | |
|---|---|---|
| 2,881,205 | Dakli et al. | Apr. 7, 1959 |
| 2,886,591 | Lautenschlager et al. | May 12, 1959 |

FOREIGN PATENTS

| | | |
|---|---|---|
| 942,809 | Germany | Apr. 12, 1956 |

OTHER REFERENCES

Mellor: "A Comprehensive Treatise on Inorganic and Theoretical Chemistry, vol. IV, 1946, pp. 794–795.

Reppe: Ann. Chem. Justus Liebigs 582, 26–27 (1953).